United States Patent
Chen

(10) Patent No.: US 10,140,734 B2
(45) Date of Patent: Nov. 27, 2018

(54) SYSTEM AND METHOD FOR SIMULATANEOUS IMAGE ARTIFACT REDUCTION AND TOMOGRAPHIC RECONSTRUCTION OF IMAGES DEPICTING TEMPORAL CONTRAST DYNAMICS

(71) Applicant: Wisconsin Alumni Research Foundation, Madison, WI (US)

(72) Inventor: Guang-Hong Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/011,101

(22) Filed: Jan. 29, 2016

(65) Prior Publication Data

US 2017/0221233 A1   Aug. 3, 2017

(51) Int. Cl.
*G06K 9/00*     (2006.01)
*G06T 11/00*    (2006.01)

(52) U.S. Cl.
CPC .......... *G06T 11/008* (2013.01); *G06T 11/006* (2013.01); *G06T 2211/412* (2013.01);
(Continued)

(58) Field of Classification Search
CPC ................. G06T 11/008; G06T 11/006; G06T 2211/436; G06T 2211/412; G06T 2211/424; G06T 2211/421
(Continued)

(56) References Cited

U.S. PATENT DOCUMENTS 5,641,965 A    6/1997  Barber et al.
6,957,341 B2 * 10/2005 Rice .......................... G06F 21/14
                                                  708/200
(Continued)

FOREIGN PATENT DOCUMENTS

WO     2014159029 A1   10/2014

OTHER PUBLICATIONS

Chen, et al., Synchronized Multiartifact Reduction with Tomographic Reconstruction (SMART-RECON): A Statistical Model Based Iterative Image Reconstruction Method to Eliminate Limited-View Artifacts and to Mitigate the Temporal-Average Artifacts in Time-Resolved CT, Medical Physics, 2015, 42(8):4698-4707.

(Continued)

*Primary Examiner* — Aaron W Carter
(74) *Attorney, Agent, or Firm* — Quarles & Brady LLP

(57) ABSTRACT

Described here is a system and method for image reconstruction that can automatically and iteratively produce multiple images from one set of acquired data, in which each of these multiple images corresponds to a subset of the acquired data that is self-consistent, but inconsistent with other subsets of the acquired data. The image reconstruction includes iteratively minimizing the rank of an image matrix whose columns each correspond to a different image, and in which one column corresponds to a user-provided prior image of the subject. The rank minimization is constrained subject to a consistency condition that enforces consistency between the forward projection of each column in the image matrix and a respective subset of the acquired data that contains data that is consistent with data in the subset, but inconsistent with data not in the subset.

15 Claims, 7 Drawing Sheets

(52) U.S. Cl.
CPC ... *G06T 2211/421* (2013.01); *G06T 2211/424* (2013.01); *G06T 2211/436* (2013.01)

(58) Field of Classification Search
USPC ......... 382/128, 131, 154; 1/1; 324/307, 309; 345/419, 420, 424; 708/200, 446; 713/190, 194
See application file for complete search history.

(56) References Cited

U.S. PATENT DOCUMENTS

| | | | |
|---|---|---|---|
| 7,132,828 B2* | 11/2006 | Lustig | G01R 33/5613 |
| | | | 324/307 |
| 7,444,013 B2* | 10/2008 | Chen | G06T 7/596 |
| | | | 345/420 |
| 7,795,869 B1 | 9/2010 | Bydder | |
| 8,194,937 B2 | 6/2012 | Chen | |
| 8,229,199 B2 | 7/2012 | Chen et al. | |
| 8,374,413 B2 | 2/2013 | Chen | |
| 8,942,283 B2* | 1/2015 | Pace | G06T 9/001 |
| | | | 375/240.1 |
| 8,989,465 B2* | 3/2015 | Trzasko | G06T 11/003 |
| | | | 382/128 |
| 9,384,566 B2* | 7/2016 | Chen | G06T 11/006 |
| 2003/0076988 A1 | 4/2003 | Liang et al. | |
| 2006/0074290 A1 | 4/2006 | Chen et al. | |
| 2009/0161932 A1 | 6/2009 | Chen | |
| 2009/0161933 A1 | 6/2009 | Chen | |
| 2011/0304745 A1 | 12/2011 | Wang et al. | |
| 2012/0099774 A1 | 4/2012 | Akcakaya et al. | |
| 2012/0243761 A1 | 9/2012 | Senzig et al. | |
| 2013/0182930 A1 | 7/2013 | Trzasko et al. | |
| 2013/0343624 A1 | 12/2013 | Thibault et al. | |
| 2013/0343625 A1 | 12/2013 | Samsonov et al. | |
| 2014/0270439 A1* | 9/2014 | Chen | G06T 11/006 |
| | | | 382/131 |
| 2017/0076467 A1* | 3/2017 | Mistretta | G06T 7/2053 |
| 2017/0221233 A1* | 8/2017 | Chen | G06T 11/005 |
| 2017/0221234 A1* | 8/2017 | Chen | G06T 11/006 |
| 2017/0231588 A1* | 8/2017 | Shores | A61B 6/502 |
| | | | 600/427 |
| 2018/0018796 A1* | 1/2018 | Chen | G06T 11/006 |

OTHER PUBLICATIONS

Majumdar, et al., An Algorithm for Sparse MRI Reconstruction by Schatten p-norm Minimization, Magnetic Resonance Imaging, 2011, 29:408-417.

Majumdar, A Sparsity Based Approach Towards Fast MRI Acquisition, Thesis, The University of British Columbia, Vancouver, Jul. 2012, 251 pages.

Majumdar, et al., Dynamic CT Reconstruction by Smoothed Rank Minimization, Radio Frequency Identification (Lecture Notes in Computer Science), K. Mori et al. (Eds.): MICCAI 2013, Part III, LNCS 8151, pp. 131-138.

Zhao, et al., Low Rank Matrix Recovery for Real-Time Cardiac MRI, IEEE International Symposium on Biomedical Imaging: From Nano to Macro, 2010, pp. 996-999.

PCT International Search Report and Written Opinion, PCT/US2017/015254, dated Apr. 6, 2017.

* cited by examiner

SYSTEM AND METHOD FOR SIMULATANEOUS IMAGE ARTIFACT REDUCTION AND TOMOGRAPHIC RECONSTRUCTION OF IMAGES DEPICTING TEMPORAL CONTRAST DYNAMICS

STATEMENT REGARDING FEDERALLY SPONSORED RESEARCH

This invention was made with government support under EB009699 awarded by the National Institutes of Health. The government has certain rights in the invention.

BACKGROUND OF THE INVENTION

The field of the invention is systems and methods for medical image reconstruction. More particularly, the invention relates to systems and method for simultaneously reducing image artifacts while reconstructing images from data obtained with a medical imaging system, such as an x-ray computed tomography system, where those images depict a temporal contrast dynamic, such as contrast agent uptake or dynamic physiological motion.

Time-resolved imaging methods can provide important diagnostic information related to diseases. For example, in contrast-enhanced breast imaging, the contrast uptake curve can be used as a biomarker for differentiating a benign tumor from a malignant tumor. Although cone beam computed tomography ("CBCT") breast imaging methods have obtained FDA clearance, these methods are not without their drawbacks, including relatively high radiation dose and sensitivity to subject motion. Currently, to obtain a time-resolved CBCT image sequence, at least 4-10 CBCT acquisitions are needed. This means that radiation dose to the subject will be repeated 4-10 times and the likelihood to get images contaminated by respiratory motion is 4-10 times higher. Thus, there remains a need to provide time-resolved CBCT imaging of the breast with reduced dose and less sensitivity to motion artifacts.

Another example of time-resolved imaging is in neuro-interventional procedures. In these procedures it is common for the clinician to routinely perform a three dimensional x-ray digital subtracted angiography ("3D-DSA") to evaluate the success of a procedure. Currently, 3D-DSA is implemented using two 3D CBCT acquisitions: one performed before contrast injection and the other acquired after contrast injection. A pre-contrast and post-contrast image are then individually reconstructed and subtracted to generated the 3D-DSA images. Again, current practices suffer from two limitations: relatively high radiation dose caused by needing two separate acquisitions and motion artifacts caused by subject motion between the two acquisitions.

Another example of time-resolved imaging is in cardiac CT imaging. With the current development of whole heart coverage detectors, it has been said the single heart beat and submillisecond acquisitions will be sufficient to freeze cardiac motion within certain heart rates. When heart rate increases, however, cardiac CT image quality suffers. Thus, there remains a need to provide time-resolved cardiac CT imaging from a single short scan acquisition.

SUMMARY OF THE INVENTION

The present invention overcomes the aforementioned drawbacks by providing a method for reconstructing an image using a medical imaging system. The method includes acquiring data from a subject with the imaging system and initializing an image matrix having columns that each correspond to a different image of the subject that is consistent with at least a subset of the acquired data. An augmented image matrix is then generated by augmenting the image matrix with a prior image that depicts the subject by vectorizing the prior image and concatenating the vectorized prior image as a column in the image matrix. At least one image of the subject is then reconstructed from the acquired data by performing a rank minimization to minimize a matrix rank of the augmented image matrix. This rank minimization is constrained subject to a consistency condition that promotes a forward projection of each column in the augmented image matrix to be consistent with a different subset of the acquired data. Each subset of the acquired data contains data that are consistent only with other data in that subset and are otherwise inconsistent with data in the other subsets of the acquired data.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
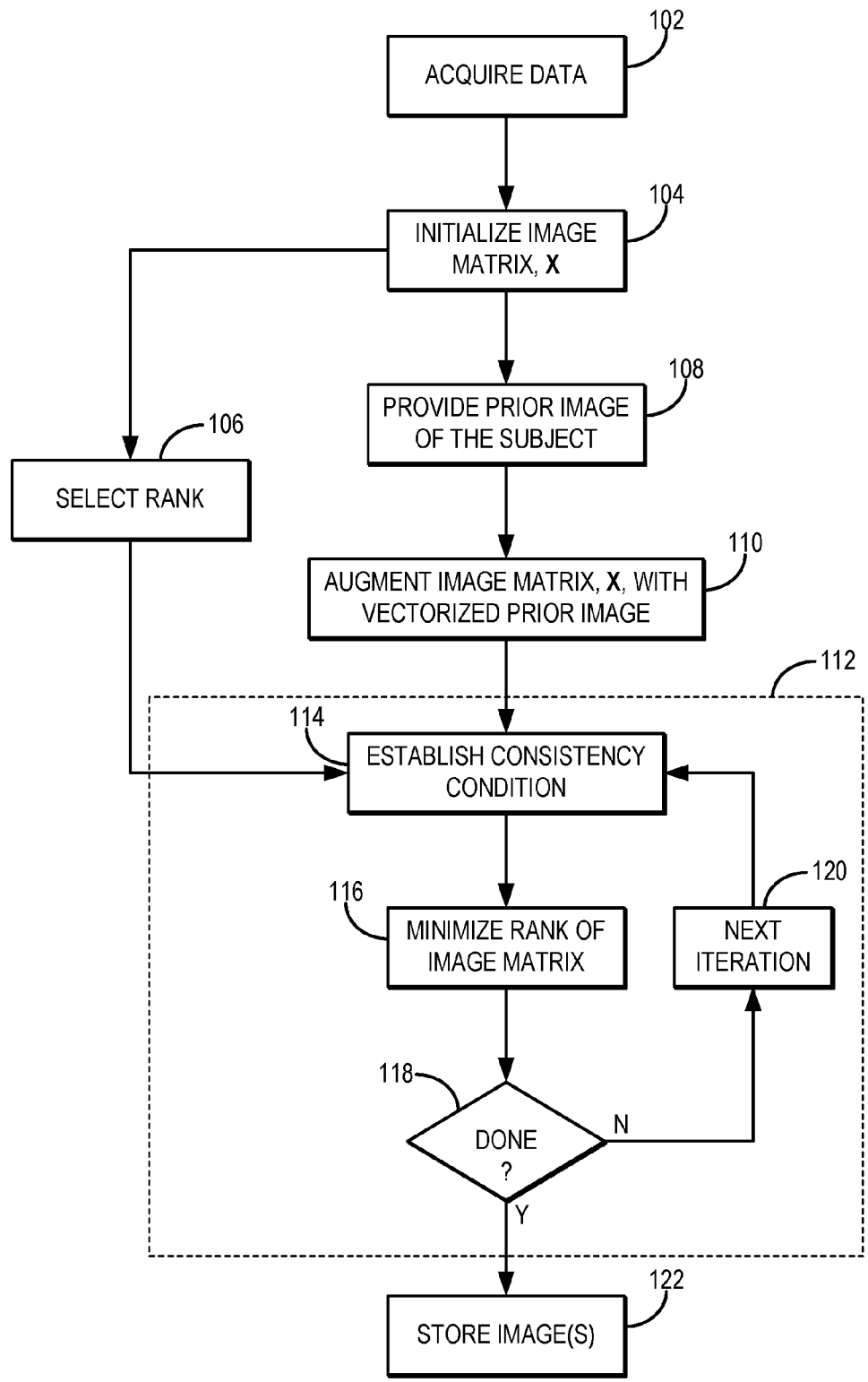
FIG. 1 is a flowchart of an example of a method for producing an image of a subject from acquired data using rank minimization to separate consistent subsets of the acquired data.

Described here are systems and methods for simultaneous image artifact reduction and tomographic image reconstruction, which may thus be referred to as a "SMART-RECON." In particular, the systems and methods described here are uniquely adapted for imaging applications where it is important or otherwise desirable to depict temporal contrast dynamics, including contrast-enhanced cone beam computed tomography ("CBCT"), such as contrast-enhanced CBCT for breast imaging; x-ray angiography, including three-dimensional digital subtraction angiography ("3D-DSA"); and cardiac computed tomography ("CT"). The systems and methods can also be advantageously suited for other medical imaging applications where temporal contrast dynamics are present, such as time-resolved CT, contrast-enhanced CT, and magnetic resonance imaging ("MRI").

In general, the image reconstruction operates by minimizing the rank of a generalized image matrix that contains a prior image of the subject; at least one desired, or target, image of the subject; and one or more other images that are associated with different subsets of the acquired data that have different degrees of consistency. Advantageously, the systems and methods described here allow for the reconstruction of high quality images from data that otherwise contains artifacts. Thus, the systems and methods described here can be implemented to reconstruct high quality images of temporal contrast dynamics without significant image artifacts.

With conventional image reconstruction techniques, such as filtered backprojection for x-ray CT imaging and Fourier-based reconstruction techniques for MRI, one image is reconstructed from one data set, despite the existence of data inconsistencies in that one data set. For example, one image is reconstructed from a single sinogram in x-ray CT imaging and one image is reconstructed from one k-space data set in MRI. This correspondence between data and the images reconstructed from that data is because these traditional image reconstruction techniques are based on the assumption that all of the acquired data are consistent with each other and satisfy the sufficiency condition. By way of example, data acquired with an x-ray CT imaging system lose their consistency when the subject moves during data acquisition, when an exogenous contrast agent is administered to the subject, and when the x-ray beam is no longer monochromatic (e.g., when beam-hardening occurs). The assumption mentioned above is typically embodied in the so-called forward imaging model, or "consistency condition,"

$$AI=Y \qquad (1);$$

which states that image reconstruction techniques should seek to reconstruct an image, I, that when forward projected is consistent with the acquired data, Y. The matrix, A, is referred to as the system matrix, which can be generally regarded as a forward projection operator that relates the reconstructed image, I, to the acquired data samples, Y. In x-ray CT imaging, the system matrix can include a reprojection operation and in MRI the system matrix can include a Fourier transform operation. The consistency condition of Eqn. (1), put in other words, states that when an image is faithfully reconstructed, the forward projection of that image should be substantially similar to, or consistent with, the data actually acquired with the imaging system.

In these conventional image reconstruction methods, there is no intrinsic mechanism that accounts for the degree of consistency or inconsistency in the acquired data. The single indication of data inconsistency is the appearance of image artifacts in the reconstructed image. To reduce the artifact levels, the acquired data can be preprocessed with the appropriate technique for the type of artifacts present in the image. It is generally unknown, however, to what extent the acquired data should be corrected before image reconstruction.

As noted above, acquired data are no longer consistent when physical effects such as subject motion, contrast enhancement, noise, beam hardening in x-ray imaging, and so on are present during the data acquisition process. These inconsistencies in the acquired data manifest as artifacts in the reconstructed images.

To address this problem, the present invention provides systems and methods for image reconstruction that account for intrinsic data consistency in the acquired data, which allows for images to be separately reconstructed with different artifact levels that depend on the inconsistency level of the acquired data. Further, the systems and methods described here are particularly adapted for reconstructing faithful images that depict temporal contrast dynamics. In many cases, an image with minimal artifacts will be reconstructed from those consistent data samples, together with an image that primarily depicts artifacts from other data with higher levels of inconsistency in the acquired data.

This concept can be interpreted as seeking to reconstruct the maximally available generalized image matrix, X, from the acquired data. If the acquired set of data samples has $N_S$ data samples, the worst case scenario is that all of the data samples are inconsistent with one another. In this case, $N_S$ images would be required to delineate the physical state of the image object. As a result, the maximally available generalized image matrix, X, would have $N_S$ columns. The number of rows in the maximally available generalized image matrix, X, would be the total number of image pixels for a two-dimensional image, or the total number of image voxels for a three-dimensional image volume. By lowering the rank of this generalized image matrix while constrained by the data consistency condition of Eqn. (1), the images with different artifact levels can be reconstructed by automatically grouping consistent data into a series of images that reflects the consistency level among the data.

The connection between data consistency and image matrix rank reduction can be understood as follows. When the acquired data are all consistent (e.g., from each view angle in x-ray CT imaging or with respect to each line in k-space in MRI), all columns in the maximally available generalized image matrix, X, will be the same. Mathematically, this generalized image matrix, X, thus has a column rank of one, or Rank(X)=1. When the acquired data can be divided into two consistency classes in some way, then the rank of the maximally available generalized image matrix, X, will increase to two, or Rank (X)=2. In this instance, the rank of the maximally available generalized image matrix can be reduced to two. In other words, the rank reduced generalized image matrix, X, contains only two columns, $$X=[X_1 X_2] \qquad (2);$$

where each column corresponds to an image reconstructed from the data in the associated consistency class. The increase in rank is because the acquired data contains two distinct groups of data that are each internally consistent, but inconsistent with each other. An example of this is when data is acquired from a subject who moves during data acquisition. The data acquired when the subject was not moving will not be consistent with the data acquired when the subject was moving. On the other hand, the data acquired when the subject was not moving will be internally consistent, as will the data acquired when the subject was moving. This property is exploited by the present invention to reconstruct an image that is free of the contributions from the inconsistent data. As will be described below, there can be more than two consistency classes in the acquired data and each of these consistency classes can be separated from each other.

In general, an image that is free of the contributions from inconsistent data can be obtained by minimizing the rank of the maximally available generalized image matrix, X, such that the forward projection of the desired column of the maximally available generalized image matrix, $X_n = I_n$, is consistent with the associated consistency class in the acquired data, $Y_n$. That is, $$\operatorname*{argmin}_{X}\{\operatorname{Rank}(X)\} \text{ such that } AI_n = Y. \qquad (3)$$

The rank minimization described by Eqn. (3) automatically and iteratively groups consistent data from different sources into several irreducible image columns in X. It is noted that each individual image, $I_n$, corresponds to a different consistency class and is a column vector in the generalized image matrix, X. That is, $$X = [I_1 \ldots I_N] \qquad (4).$$

Here, the individual image, $I_n$, corresponding to a particular consistency class is formed by applying a vecotrization operation to an ordinary image with two indices, $$I_n = vec(I_n(x,y)) \qquad (5);$$

or with three indices, $$I_n = vec(I_n(x,y,z)) \qquad (6).$$

Numerically, it is an NP-hard problem to solve the rank minimization problem of Eqn. (3) because it is equivalent to solving a zero-norm minimization problem. This point can be illustrated by introducing a singular value decomposition ("SVD") operation to the generalized image matrix, X, as follows:

$$X = U\Sigma V \qquad (7);$$

where the U and V matrices are orthogonal and the $\Sigma$ matrix is a diagonal matrix with r non-zero elements, referred to as the singular values, $\sigma_i$, of the matrix, $$\Sigma = \operatorname{diag}\{\sigma_1, \sigma_2, \ldots, \sigma_r, 0, 0, \ldots, 0\} \qquad (8).$$

As long as this SVD is performed, the rank of the generalized image matrix, X, is said to be r. Thus, minimization of the rank of the generalized image matrix, X, can be equated to minimizing the following zero-norm:

$$\operatorname*{argmin}_{X}\{\operatorname{Rank}(X)\} \equiv \operatorname*{argmin}_{X}\|X\|_0; \qquad (9)$$

where $\|X\|_0$ is the zero-norm of the generalized image matrix, X, which is equal to the number of non-zero diagonal elements in the singular value decomposition of the generalized image matrix, X. The zero-norm problem in Eqn. (9) can be practically relaxed to an $l_1$-norm, as is often done in compressed sensing. Namely, instead of directly solving the problem in Eqn. (3), the problem can be relaxed to the following convex optimization problem:

$$\operatorname*{argmin}_{X}\|X\|_*; \qquad (10)$$

where $\|X\|_*$ is the so-called nuclear norm of the generalized image matrix, X, which can be given by, $$\|X\|_* = \sum_{i=1}^{r} |\sigma_i| = \sum_{i=1}^{r} |\Sigma_{ii}|. \qquad (11)$$

The more general Schatten p-norm can also be used to relax the precise rank minimization in Eqn. (3). The Schatten p-norm is defined as, $$\|X\|_p^p = \sum_{i} \sigma_i^p. \qquad (12)$$

Using the Schatten p-norm, the rank minization in Eqn. (3) can be relaxed as the following convex optimization problem for $p \geq 1$ $$\operatorname*{argmin}_{X}\|X\|_p^p \text{ such that } AI_n = Y. \qquad (13)$$

The constrained optimization problem in Eqn. (13) can be solved by minimizing the following objective function with a quadratic penalty:

$$\operatorname*{argmin}_{X}\left\{\frac{1}{2}\|AI_n - Y\|_D^2 + \lambda\|X\|_p^p\right\}; \qquad (14)$$

where the weighted norm for a generalized input is given as, $$\|Z\|_D^2 = Z^T D Z \qquad (15);$$

with the diagonal matrix, D, given by, $$D = \operatorname{diag}\left\{\frac{1}{\zeta_1^2}, \frac{1}{\zeta_2^2}, \ldots\right\}; \qquad (16)$$

where $\xi_i^2$ is the noise variance for the $i^{th}$ measured data sample. Therefore, the diagonal matrix, D, accounts for noise in the measured data samples by assigning a lower weight to higher noise data and a higher weight to lower noise data. The parameter, $\lambda$, is used to tradeoff the data fidelity term and the relaxed matrix rank minimization term in Eqn. (14). The equivalence of the constrained optimization problem in Eqn. (13) and the unconstrained optimization problem in Eqn. (14) can be reached in the limit of $\lambda = \infty$. Additionally, the constrained optimization problem in Eqn. (13) can be solved using the well-known augmented Lagrangian multiplier method.

In Eqn. (14), rank minimization can be viewed as a regularization to the noise-penalized least square minimization. In addition to the above rank regularization, other additional regularization methods can also be added to Eqn. (14). One example of additional regularization methods includes the prior image constrained compressed sensing ("PICCS") objective function, which is described in U.S.

Pat. Nos. 8,194,937; 8,229,199; and 8,374,413, which are each herein incorporated by reference in their entirety. By incorporating the PICCS objective function, Eqn. (14) can be generalized as, $$\underset{X}{\operatorname{argmin}} \left\{ \frac{\lambda}{2} \|AI_n - Y\|_D^2 + \|X\|_p^p + \alpha \|\Psi_1 I_n\|_q^q + (1-\alpha) \|\Psi_2 (I_n - I_p)\|_q^q \right\}; \quad (17)$$

where $\Psi_1$ and $\Psi_2$ are sparsifying transforms, which promote sparsity in each individual image component, $I_n$; $I_P$ is a prior image in the PICCS reconstruction; the parameter, $\alpha$, is used to assign a weight to the term without the prior image contribution and to the term with the prior image contribution; and the q-norm of a vector, Z, is defined as, $$\|Z\|_q^q = \sum_{j=1}^{N} |Z_j|^q. \quad (18)$$

When a blind SVD operation is applied to the generalized image matrix, X, it can be computationally expensive. In practice, it is contemplated that the target rank of the generalized image matrix will generally be low; thus, a truncated SVD decomposition can be used in a numerical implementation.

As one example, the lowest rank approximation can be used, in which Rank(X)=1. In this case, all of the acquired data samples are used to reconstruct a single image. The conventional numerically efficient methods for solving such a problem is an image reconstruction technique such as filtered backprojection for x-ray CT data or Fourier inversion for k-space data acquired with an MRI system. This first pass estimation can be used as the initial guess for the first column of the generalized image matrix, X. The rank minimization process can then iteratively proceed to rank two, rank three, an upwards to the desired rank r solution. In practice, it is contemplated that r≤20 will be sufficient for most clinical imaging applications. In this case, the acquired data are sorted into r different consistency classes. Using the first column of the generalized image matrix, X, as the prior image for the PICCS reconstruction, the r columns of the generalized image matrix, X, can be reconstructed using the PICCS algorithm. Having obtained these initial solutions, the generalized image matrix, X, can be decomposed into the following form:

$$X = [I_1 \ I_2 \ \cdots \ I_{N-1} \ I_N] \quad (19)$$

$$= U^{MN \times r} \sum^{r \times r} V^{r \times MN}.$$

Here, the initially estimated r column images fill in the r columns in the U matrix. One of the optimization problems in Eqns. (3), (10), (13), (14), or (17) can be solved to iteratively determine the diagonal matrix, $\Sigma$, and also the V matrix. Furthermore, if the multiplication of the diagonal matrix, $\Sigma$, and the V matrix is treated as a single matrix, $$\tilde{V}^{r \times MN} = \Sigma V \quad (20)$$

then the optimization problem in Eqns. (3), (10), (13), (14), or (17) can be solved iteratively to determine the matrix, $\tilde{V}$.

When the above decomposition of the generalized image matrix, X, is performed such that the image matrix, X, is decomposed into the following matrix multiplication:

$$X = UV \quad (21);$$

sparsity constraints and other regularizations can be directly applied to the two matrix components, U and V. As a result, the following variation in the optimization problem can be provided.

$$\underset{X}{\operatorname{argmin}} \left\{ \frac{1}{2} \|AI_n - Y\|_D^2 + \lambda_1 \|\Psi_1 U\|_1 + \lambda_2 \|\Psi_2 V\|_1 \right\}. \quad (22)$$

When the above described procedure to compute the U matrix is used, the second term in Eqn. (22), $\lambda_1 \|\Psi_1 U\|$, can be set to zero to improve numerical efficiency.

For instance, in an x-ray CT imaging application, the rank minimization will automatically and iteratively group consistent data from different view angles into several irreducible image columns. The numerical value of the final rank of the generalized image matrix, X, is the number of distinct images that are reconstructed from the acquired data. Each of these distinct images corresponds to a different subset of the acquired data that is internally consistent.

Classification of data consistency classes will depend on the particular imaging application. In an x-ray CT application, data samples acquired at each given x-ray source position often represents a consistency class when dynamic CT imaging is performed. Examples of dynamic CT imaging includes cardiac CT imaging in diagnostic multislice CT; contrast-enhanced CT imaging, with or without organ motion involved; time-resolved cone-beam CT in image-guided radiation therapy; and time-resolved cone-beam CT using a C-arm based cone-beam CT system in image-guided interventions.

When multi-energy CT acquisitions are employed, the consistency classification can be further dependent on the x-ray spectrum. Thus, for dual energy CT acquisitions, it is natural to classify the data and images into at least two consistency classes corresponding to the two energy levels utilized in the imaging procedure.

When a conventional, single spectrum CT data acquisition is used, the data and images can be classified into two or more classes that are determined by the x-ray path lengths and image content. When highly attenuating objects, such as bony structures or exogenous metallic objects, are present in the subject, the measured data points passing though these highly attenuating objects and those measured data that do not pass through these highly attenuating objects can be classified into different consistency classes.

For an MRI system that is used to generate dynamic imaging, such as cardiac MRI or time-resolved contrast-enhanced MRI, the data consistency and corresponding image classes can be sorted based on prior knowledge of the cardiac and/or respiratory phase, or based on temporal contrast dynamics, such as differences in contrast uptake.

The higher the rank of the maximally available generalized image matrix, X, the more consistency classes that will be sought in the acquired data. That is to say, as the rank of the maximally available generalized image matrix, X, increases, the inconsistencies in the acquired data will be spread to more images. Depending on the imaging application, this feature can be advantageously relied upon to separate a general class of inconsistency into smaller subsets. For example, motion artifacts can be parsed into motions occurring at different speeds. In this manner, slower motion artifacts (e.g., respiratory motion) from a data set can be separated from faster motion artifacts (e.g., cardiac motion) in that same data set.

The rank minimization can also be combined with other minimization constraints to further improve image quality. For instance, the minimization presented in Eqn. (3) can be additionally constrained subject to conditions or optimization requirements. One example of an additional constraint is a prior image constrained compressed sensing ("PICCS") constraint, such as the ones described in U.S. Pat. Nos. 8,194,937; 8,229,199; and 8,374,413, which are each herein incorporated by reference in their entirety. Alternatively, other compressed sensing constraints could be imposed while minimizing the rank of the maximally available image matrix.

Advantageously, minimizing the rank of the maximally available image matrix in this manner allows for the separation of unwanted components of an image from the desirable components. In some instances, the unwanted components can then be used to further correct the desirable components or to ascertain additional information about the subject.

The methods described above can be particularly adapted for imaging temporal contrast dynamics, such as those that may be present in contrast-enhanced CBCT of the breast, 3D-DSA, or cardiac imaging applications. In general, the methods described above can be so adapted by concatenating a vectorized prior image of the subject to the generalized image matrix, X. Including the prior image in the image matrix, X, has the effect of reducing limited view angle artifacts caused by truncation in the range of view angle sampling, or by reducing streaking artifacts caused by view angle undersampling. For instance, the generalized image matrix can be replaced with the following augmented image matrix, $$\tilde{X}=[I_P X]=[I_P I_1 \ldots I_N] \quad (23).$$

In the augmented image matrix, the prior image can be any suitable image that contains a priori information about the subject. As one example, the prior image can be an image reconstructed from the acquired data using a conventional image reconstruction technique. For instance, when the acquired data is time-resolved data, the prior image can be an image reconstructed from all of the individual time frames. Such an image will be riddled with image artifacts, but will contain a priori information about the subject, such as the spatial support of the subject.

In another example, when the acquired data is cardiac CT data, the prior image can be an image reconstructed from a short-scan angular range using a conventional filtered back-projection method. The reconstructed image may be contaminated by residual cardiac motion artifacts in coronary arteries. In this case, a coarse image segmentation can be performed to segment out the coronary arteries and then an inpainting process can be used to inpaint the surrounding area by imposing a criterion that the image intensity value be positive or above the average CT number from the surrounding tissues.

Referring now to FIG. 1, a flowchart setting forth the steps of an example of a method for producing an image of a subject from acquired data using rank minimization to separate consistent subsets of the acquired data is illustrated. The method begins with the acquisition of data using a medical imaging system, as indicated at step 102. The data acquisition can be performed with any suitable medical imaging system, including an x-ray computed tomography system, an x-ray tomosynthesis system, and x-ray C-arm system, a magnetic resonance imaging system, an ultrasound system, a positron emission tomography system, and so on. The acquired data generally will include inconsistencies resulting from one or more different sources. Examples of these different sources of inconsistencies include aliasing caused by undersampling, noise, x-ray beam-hardening, metal artifacts in x-ray imaging, subject motion occurring during data acquisition, and so on.

After data have been acquired, the image reconstruction process generally begins. First, an image matrix having columns that will be associated with different images is initialized, as indicated at step 104, and as described above. Optionally, a desired rank to which the image matrix should be minimized is selected, as indicated at step 106. As discussed above, the choice of image matrix rank can be determined using a singular value decomposition of the augmented image matrix. A prior image of the subject is then provided as indicated at step 108 and used to form an augmented image matrix at step 110. As described above, the augmented image matrix can generally be formed by vectorizing the prior image can concatenating the vectorized prior image to the image matrix initialized in step 104. Examples of prior images are described above and described again with respect to some specific, non-limiting, examples below.

As indicated generally at 112, a target image of the subject is then reconstructed using an iterative rank minimization process that is subject to a consistency condition constraint in which each column of the augmented image matrix, except for the prior image column, is required to be consistent with a unique subset of the acquired data that is to some extent inconsistent with the rest of the acquired data. That is, each column of the reconstructed image matrix will correspond to an image representative of a unique subset of the acquired data. Each of these subsets of the acquired data contain data that are consistent with each other, but at the same time, each subset of the acquired data contain data that are generally inconsistent with data not included in the subset. As such, the image reconstruction process is capable of automatically separating the acquired data into different subsets of data that each correspond to a unique consistency class. By minimizing the rank of the augmented image matrix, the fewest possible number of such consistency classes is sought. As noted above, however, the desired augmented image matrix rank can also be selected to force the separation of the acquired data into a predefined number of consistency classes.

The reconstruction of the image matrix thus includes establishing the aforementioned consistency condition between the columns of the augmented image matrix and subsets of the acquired data, as indicated at step 114. The rank of the augmented image matrix is then minimized, as indicated at step 116. This process is iteratively repeated until a stopping criterion is met, as determined at decision block 118. Examples of stopping criterion include when a target rank, which may be optionally selected as described above, is achieved, and when the difference of the estimated values in two consecutive iterations is smaller than a predetermined threshold value. If the stopping criterion is not met, the next iteration of the minimization begins, as indicated at step 120. When the stopping criterion is met, however, the images contained in the columns of the augmented image matrix are individually stored, as indicated at step 120. Several particular applications of this method will now be described.

Breast CBCT Examples

Figure 2:
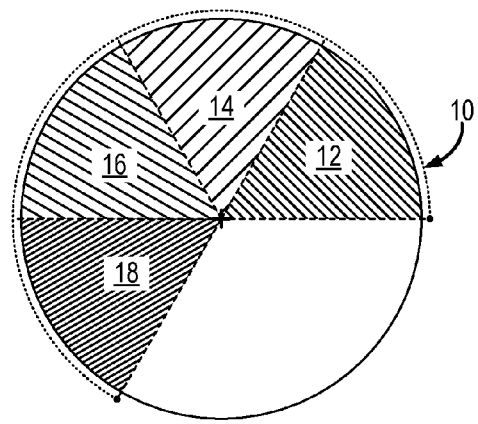
FIG. 2 illustrates an example of a short scan data acquisition in which the acquired data are segmented into four different temporal and/or angular segments of data.
Figure 3:
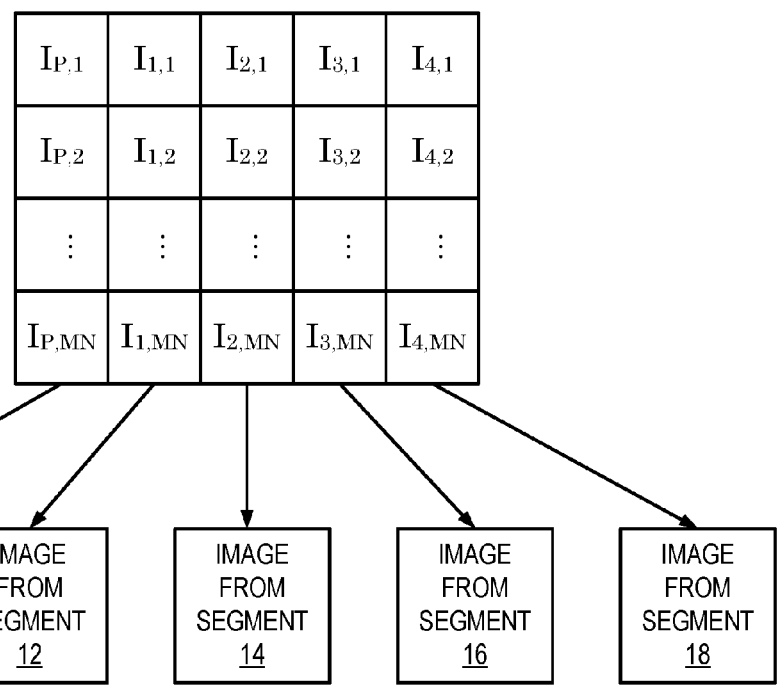
FIG. 3 illustrates an example of a rank-minimized image matrix having columns associated with a prior image of a subject and images associated with different temporal and/or angular segments of short scan data.

One example of implementing the method of the present invention is for breast CBCT applications, which is described now with respect to FIGS. 2 and 3. For breast CBCT, it is desirable to accurately image the subject during contrast agent uptake into the breast tissue. As described above, it is also desirable to minimize the radiation dose imparted to the subject. The image reconstruction techniques described above provide a method in which high quality images of the subject at 4-6 different time points can be obtained during contrast agent uptake using only a single short scan acquisition, rather than the multiple acquisitions typically required for breast CBCT.

FIG. 2 illustrates an example short scan 10 with a CBCT system. In general, a short scan constitutes scanning through an angle of 180 degrees plus the fan angle of the imaging system. In the case of a CBCT system, the fan angle is typically about 60 degrees. This single data set thus contains data that are associated with different time points on a contrast agent uptake curve. Using the image reconstruction techniques described above, an augmented image matrix can be formed to reconstruct separate images associated with different time points during the contrast agent uptake.

As one non-limiting example, the short scan data can be segmented into distinct temporal segments, such as segment 12, segment 14, segment 16, and segment 18 shown in FIG. 2. It will be appreciated by those skilled in the art, however, that the short scan data can be parsed into any suitable number of different angular segments depending on the desired number of time points to reconstruct. The method of the present invention can then be implemented to reconstruct images associated with these distinct temporal segments, as illustrated in FIG. 3. As one example, the prior image, $I_P$, for the augmented image matrix, $\hat{X}$, can be selected as an image reconstructed from all of the short scan data.

3D-DSA Examples

Figure 4A:
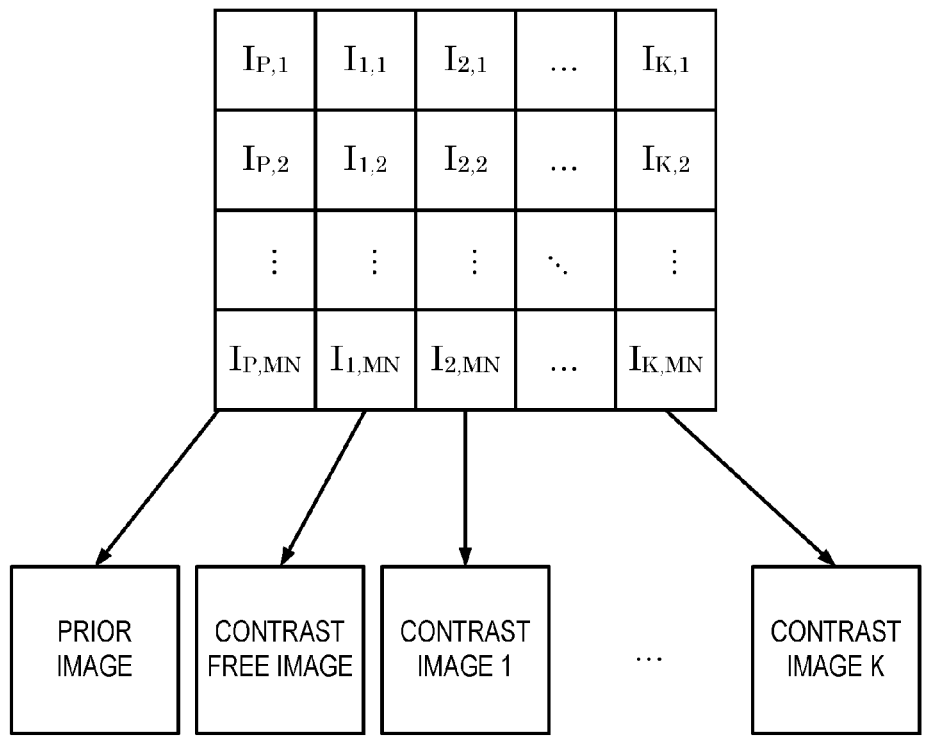
FIG. 4A illustrates an example of a rank-minimized image matrix having columns associated with a prior image of a subject and different time frames obtained during an x-ray angiography scan, including a contrast free image and multiple different images in which a contrast agent is present.
Figure 4B:
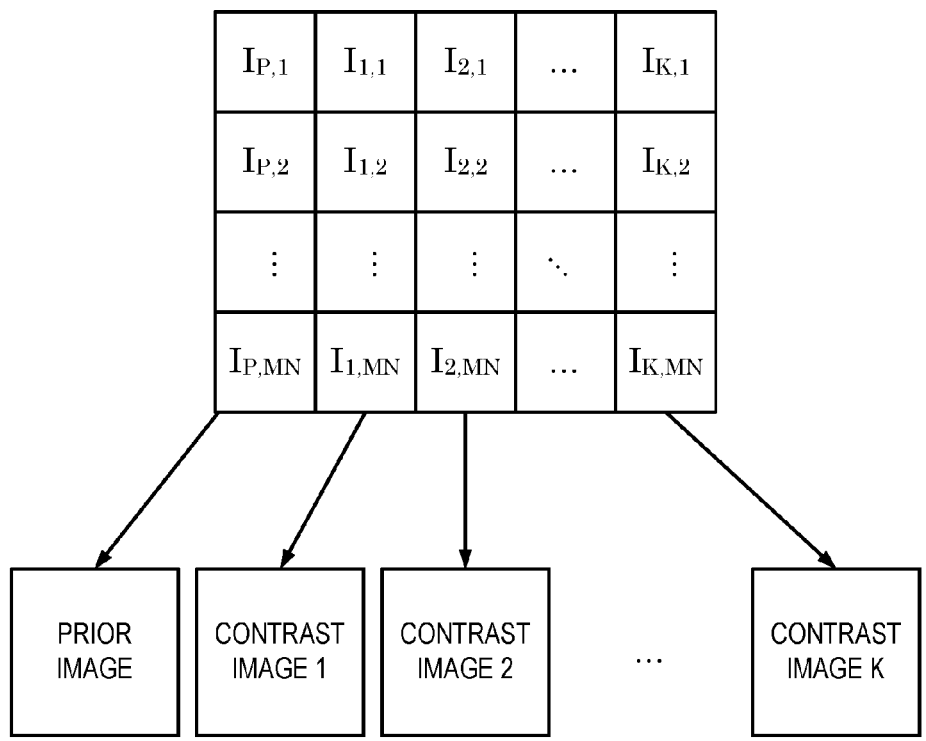
FIG. 4B illustrates an example of a rank-minimized image matrix having columns associated with a prior image of a subject and different time frames obtained during an x-ray angiography scan, including multiple different images in which a contrast agent is present.

Another example of implementing the method of the present invention is for x-ray angiography applications, such as 3D-DSA, which is described now with respect to FIGS. 4a and 4B. In this example, the method of the present invention is implemented to reconstruct two or more image frames at different time points of contrast agent passage through the subject's vasculature. In this manner, the two or more images depict the subject's vasculature during a time-resolved angiographic or perfusion imaging procedure.

In some embodiments, such as the one illustrated in FIG. 4A, data acquisition can be performed to span before and during contrast uptake. In this example, one image can be reconstructed as an image in which no contrast agent is present, and two or more images can be reconstructed as images where contrast agent is present in the subject's vasculature. One or more difference images can then be created by computing the difference between the non-contrast image and one or more of the contrast images.

In some other embodiments, such as the one illustrated in FIG. 4B, a single data acquisition during the passage of the contrast agent through the subject's vasculature can be implemented. Multiple different images, each associated with different time points in the contrast time curve, can then be reconstructed. These images can then be subtracted in various combinations to produce difference images that provide different depictions of the subject's vasculature. In this manner, the methods described here can provide "mask-free-3D-DSA, in which only a single acquisition is required to produce DSA images that depict the subject's vasculature.

In these examples, the augmented matrix, $\hat{X}$, can include a prior image, $I_P$, that is generated using a convention reconstruction of some or all of the acquired data.

Dynamic Imaging Examples

Figure 5:
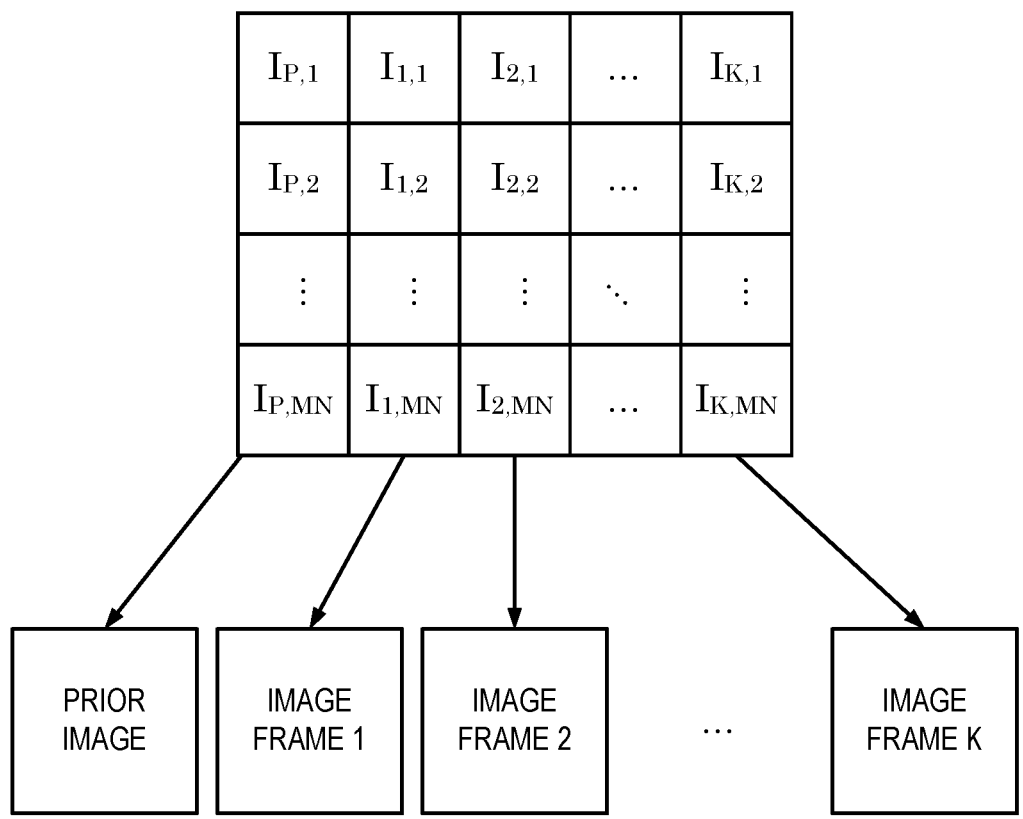
FIG. 5 illustrates an example of a rank-minimized image matrix having columns associated with different time frames obtained during a dynamic imaging acquisition, each of the different time frames corresponding to a different set of self-consistent data.

Another example of implementing the method of the present invention is for dynamic imaging applications, such as cardiac CT imaging, which is described now with respect to FIG. 5. As illustrated in FIG. 5, the method of the present invention is also capable of reconstructing a series of image frames, such as a series of images depicting a subject's heart during a cardiac imaging procedure, a subject's respiration, and so on. In these instances, the method of the present invention is able to recover a set of consistent images of the subject acquired during the course of data acquisition. As one example, in cardiac imaging applications, the method of the present invention can be used to produce motion consistent images for each cardiac phase because the data acquired at a given phase of the cardiac cycle will be largely consistent with other data acquired at the same cardiac phase, whereas data acquired at different cardiac phases will be largely inconsistent.

In cardiac and respiratory imaging applications, the prior image can be generated using a thresholding and segmentation technique. For example, an image of the subject can first be reconstructed from the acquired data using a conventional image reconstruction technique. The reconstructed image can then be thresholded and segmented based on the thresholding. As one example, the coronary arteries in a cardiac CT image can be segmented out. In motion prone regions, cardiac motion artifacts include distortions of the reconstructed coronary arteries and the surrounding "holes," or dark regions. These dark regions result in the forward projection of the artifacts-contaminated image to be consistent with the data, and also result in reaching a local minimum in iterative motion artifact correction. In this case, after the coronary arteries are segmented out, these holes/dark regions are replaced by the positive mean value of the CT numbers from a nearby region of tissues. After this segmentation-compensation process, a prior image is generated to augment the target spatial-temporal image matrix in the cardiac CT reconstruction.

Figure 6A:
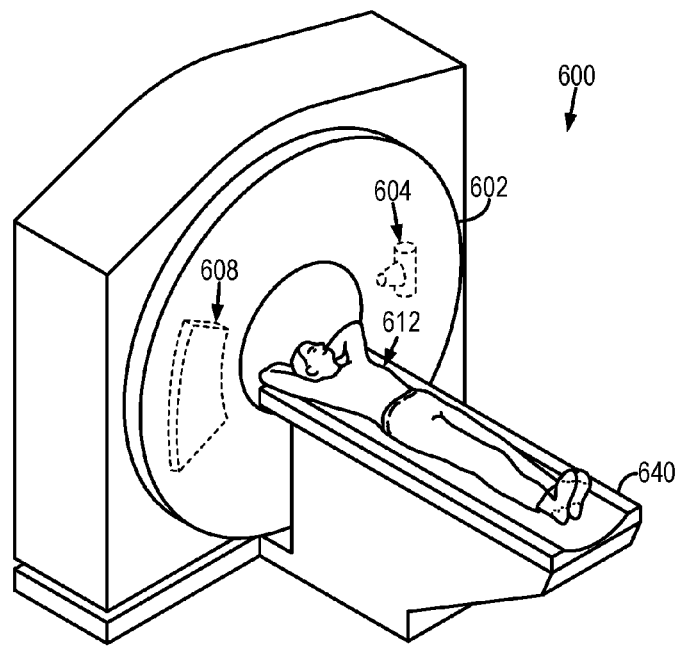
FIG. 6A is an illustration of an example of an x-ray computed tomography system.
Figure 6B:
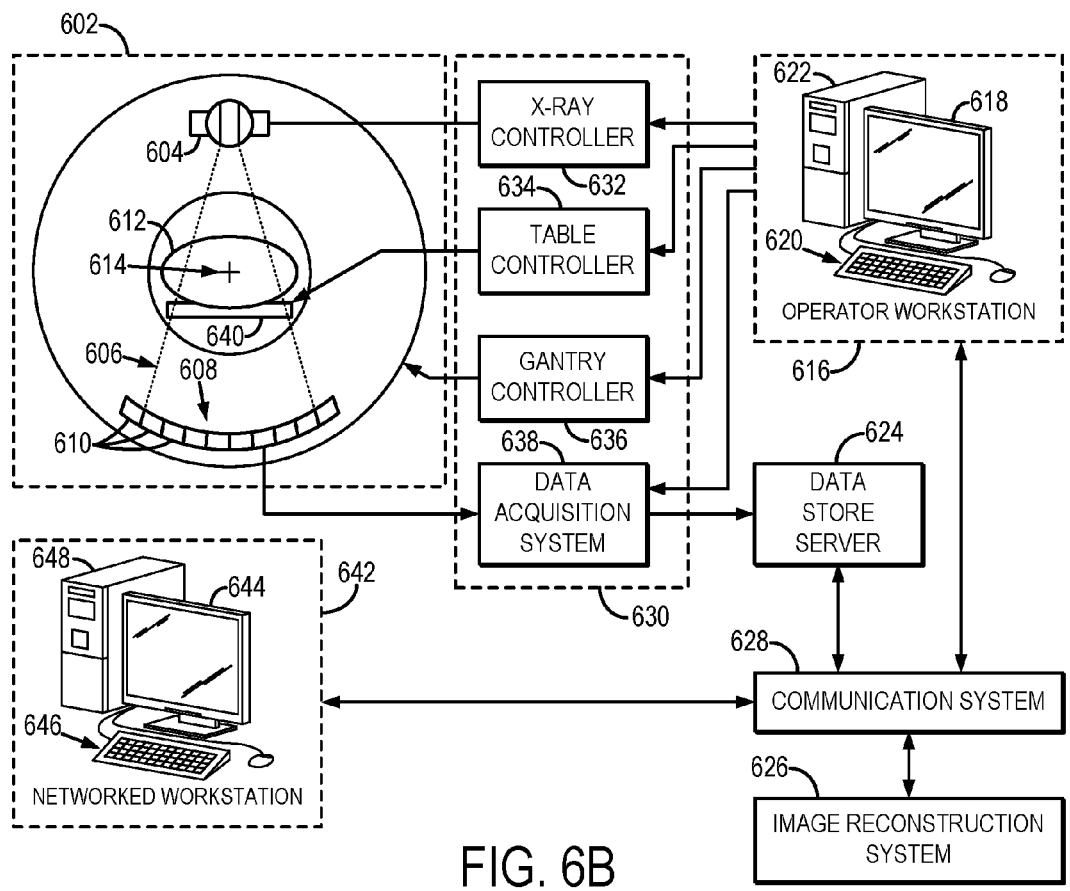
FIG. 6B is a block diagram of the x-ray CT system of FIG. 6A.

Referring particularly now to FIGS. 6A and 6B, an example of an x-ray computed tomography ("CT") imaging system 600 is illustrated. The CT system includes a gantry 602, to which at least one x-ray source 604 is coupled. The x-ray source 604 projects an x-ray beam 606, which may be a fan-beam or cone-beam of x-rays, towards a detector array 608 on the opposite side of the gantry 602. The detector array 608 includes a number of x-ray detector elements 610. Together, the x-ray detector elements 610 sense the projected x-rays 606 that pass through a subject 612, such as a medical patient or an object undergoing examination, that is positioned in the CT system 600. Each x-ray detector element 610 produces an electrical signal that may represent the intensity of an impinging x-ray beam and, hence, the attenuation of the beam as it passes through the subject 612. In some configurations, each x-ray detector 610 is capable of counting the number of x-ray photons that impinge upon the detector 610. During a scan to acquire x-ray projection data, the gantry 602 and the components mounted thereon rotate about a center of rotation 614 located within the CT system 600.

The CT system 600 also includes an operator workstation 616, which typically includes a display 618; one or more input devices 620, such as a keyboard and mouse; and a computer processor 622. The computer processor 622 may include a commercially available programmable machine running a commercially available operating system. The operator workstation 616 provides the operator interface that enables scanning control parameters to be entered into the CT system 600. In general, the operator workstation 616 is in communication with a data store server 624 and an image reconstruction system 626. By way of example, the operator workstation 616, data store sever 624, and image reconstruction system 626 may be connected via a communication system 628, which may include any suitable network connection, whether wired, wireless, or a combination of both. As an example, the communication system 628 may include both proprietary or dedicated networks, as well as open networks, such as the internet.

The operator workstation 616 is also in communication with a control system 630 that controls operation of the CT system 600. The control system 630 generally includes an x-ray controller 632, a table controller 634, a gantry controller 636, and a data acquisition system 638. The x-ray controller 632 provides power and timing signals to the x-ray source 604 and the gantry controller 636 controls the rotational speed and position of the gantry 602. The table controller 634 controls a table 640 to position the subject 612 in the gantry 602 of the CT system 600.

The DAS 638 samples data from the detector elements 610 and converts the data to digital signals for subsequent processing. For instance, digitized x-ray data is communicated from the DAS 638 to the data store server 624. The image reconstruction system 626 then retrieves the x-ray data from the data store server 624 and reconstructs an image therefrom. The image reconstruction system 626 may include a commercially available computer processor, or may be a highly parallel computer architecture, such as a system that includes multiple-core processors and massively parallel, high-density computing devices. Optionally, image reconstruction can also be performed on the processor 622 in the operator workstation 616. Reconstructed images can then be communicated back to the data store server 624 for storage or to the operator workstation 616 to be displayed to the operator or clinician.

The CT system 600 may also include one or more networked workstations 642. By way of example, a networked workstation 642 may include a display 644; one or more input devices 646, such as a keyboard and mouse; and a processor 648. The networked workstation 642 may be located within the same facility as the operator workstation 616, or in a different facility, such as a different healthcare institution or clinic.

The networked workstation 642, whether within the same facility or in a different facility as the operator workstation 616, may gain remote access to the data store server 624 and/or the image reconstruction system 626 via the communication system 628. Accordingly, multiple networked workstations 642 may have access to the data store server 624 and/or image reconstruction system 626. In this manner, x-ray data, reconstructed images, or other data may be exchanged between the data store server 624, the image reconstruction system 626, and the networked workstations 642, such that the data or images may be remotely processed by a networked workstation 642. This data may be exchanged in any suitable format, such as in accordance with the transmission control protocol ("TCP"), the internet protocol ("IP"), or other known or suitable protocols.

Figure 7:
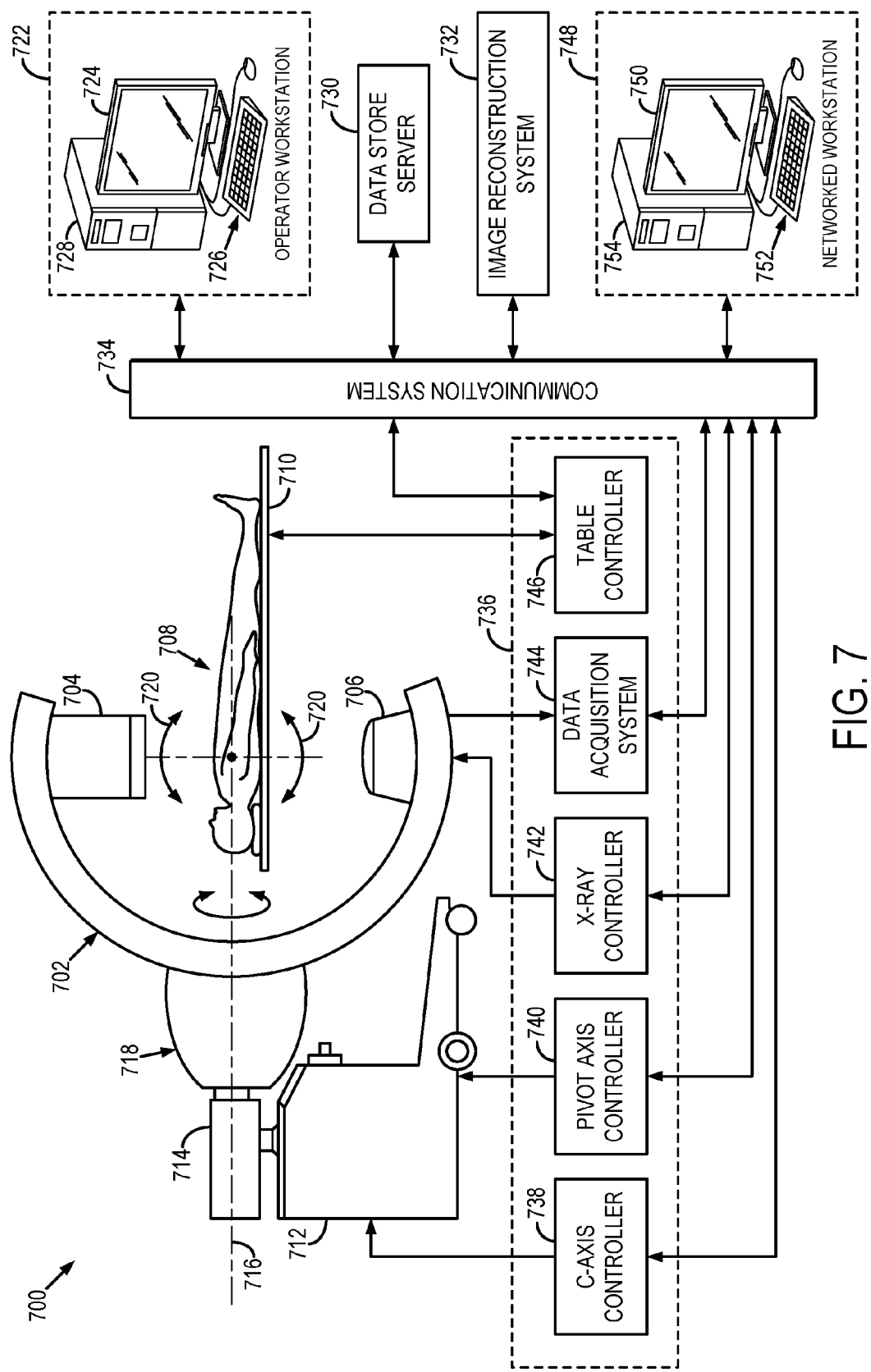
FIG. 7 is an illustration of an example of a C-arm x-ray imaging system.

Referring particularly to FIG. 7, an example of a so-called "C-arm" x-ray imaging system 700 is illustrated for use in accordance with some embodiments of the present invention. Such an imaging system is generally designed for use in connection with interventional procedures. The C-arm x-ray imaging system 700 includes a gantry 702 having a C-arm to which an x-ray source assembly 704 is coupled on one end and an x-ray detector array assembly 706 is coupled at its other end. The gantry 702 enables the x-ray source assembly 704 and detector array assembly 706 to be oriented in different positions and angles around a subject 708, such as a medical patient or an object undergoing examination, that is positioned on a table 710. When the subject 708 is a medical patient, this configuration enables a physician access to the subject 708.

The x-ray source assembly 704 includes at least one x-ray source that projects an x-ray beam, which may be a fan-beam or cone-beam of x-rays, towards the x-ray detector array assembly 706 on the opposite side of the gantry 702. The x-ray detector array assembly 706 includes at least one x-ray detector, which may include a number of x-ray detector elements. Examples of x-ray detectors that may be included in the x-ray detector array assembly 706 include flat panel detectors, such as so-called "small flat panel" detectors, in which the detector array panel may be around 20×20 centimeters in size. Such a detector panel allows the coverage of a field-of-view of approximately twelve centimeters.

Together, the x-ray detector elements in the one or more x-ray detectors housed in the x-ray detector array assembly 706 sense the projected x-rays that pass through a subject 708. Each x-ray detector element produces an electrical signal that may represent the intensity of an impinging x-ray beam and, thus, the attenuation of the x-ray beam as it passes through the subject 708. In some configurations, each x-ray detector element is capable of counting the number of x-ray photons that impinge upon the detector. During a scan to acquire x-ray projection data, the gantry 702 and the components mounted thereon rotate about an isocenter of the C-arm x-ray imaging system 700.

The gantry 702 includes a support base 712. A support arm 714 is rotatably fastened to the support base 712 for rotation about a horizontal pivot axis 716. The pivot axis 716 is aligned with the centerline of the table 710 and the support arm 714 extends radially outward from the pivot axis 716 to support a C-arm drive assembly 718 on its outer end. The C-arm gantry 702 is slidably fastened to the drive assembly 718 and is coupled to a drive motor (not shown) that slides the C-arm gantry 702 to revolve it about a C-axis, as indicated by arrows 720. The pivot axis 716 and C-axis are orthogonal and intersect each other at the isocenter of the C-arm x-ray imaging system 700, which is indicated by the black circle and is located above the table 710.

The x-ray source assembly 704 and x-ray detector array assembly 706 extend radially inward to the pivot axis 716 such that the center ray of this x-ray beam passes through the system isocenter. The center ray of the x-ray beam can thus be rotated about the system isocenter around either the pivot axis 716, the C-axis, or both during the acquisition of x-ray attenuation data from a subject 708 placed on the table 710. During a scan, the x-ray source and detector array are rotated about the system isocenter to acquire x-ray attenuation projection data from different angles. By way of example, the detector array is able to acquire thirty projections, or views, per second.

The C-arm x-ray imaging system 700 also includes an operator workstation 722, which typically includes a display 724; one or more input devices 726, such as a keyboard and mouse; and a computer processor 728. The computer processor 728 may include a commercially available programmable machine running a commercially available operating system. The operator workstation 722 provides the operator interface that enables scanning control parameters to be entered into the C-arm x-ray imaging system 700. In general, the operator workstation 722 is in communication with a data store server 730 and an image reconstruction system 732. By way of example, the operator workstation 722, data store sever 730, and image reconstruction system 732 may be connected via a communication system 734, which may include any suitable network connection, whether wired, wireless, or a combination of both. As an example, the communication system 734 may include both proprietary or dedicated networks, as well as open networks, such as the internet.

The operator workstation 722 is also in communication with a control system 736 that controls operation of the C-arm x-ray imaging system 700. The control system 736 generally includes a C-axis controller 738, a pivot axis controller 740, an x-ray controller 742, a data acquisition system ("DAS") 744, and a table controller 746. The x-ray controller 742 provides power and timing signals to the x-ray source assembly 704, and the table controller 746 is operable to move the table 710 to different positions and orientations within the C-arm x-ray imaging system 700.

The rotation of the gantry 702 to which the x-ray source assembly 704 and the x-ray detector array assembly 706 are coupled is controlled by the C-axis controller 738 and the pivot axis controller 740, which respectively control the rotation of the gantry 702 about the C-axis and the pivot axis 716. In response to motion commands from the operator workstation 722, the C-axis controller 738 and the pivot axis controller 740 provide power to motors in the C-arm x-ray imaging system 700 that produce the rotations about the C-axis and the pivot axis 716, respectively. For example, a program executed by the operator workstation 722 generates motion commands to the C-axis controller 738 and pivot axis controller 740 to move the gantry 702, and thereby the x-ray source assembly 704 and x-ray detector array assembly 706, in a prescribed scan path.

The DAS 744 samples data from the one or more x-ray detectors in the x-ray detector array assembly 706 and converts the data to digital signals for subsequent processing. For instance, digitized x-ray data is communicated from the DAS 744 to the data store server 730. The image reconstruction system 732 then retrieves the x-ray data from the data store server 730 and reconstructs an image therefrom. The image reconstruction system 730 may include a commercially available computer processor, or may be a highly parallel computer architecture, such as a system that includes multiple-core processors and massively parallel, high-density computing devices. Optionally, image reconstruction can also be performed on the processor 728 in the operator workstation 722. Reconstructed images can then be communicated back to the data store server 730 for storage or to the operator workstation 722 to be displayed to the operator or clinician.

The C-arm x-ray imaging system 700 may also include one or more networked workstations 748. By way of example, a networked workstation 748 may include a display 750; one or more input devices 752, such as a keyboard and mouse; and a processor 754. The networked workstation 748 may be located within the same facility as the operator workstation 722, or in a different facility, such as a different healthcare institution or clinic.

The networked workstation 748, whether within the same facility or in a different facility as the operator workstation 722, may gain remote access to the data store server 730, the image reconstruction system 732, or both via the communication system 734. Accordingly, multiple networked workstations 748 may have access to the data store server 730, the image reconstruction system 732, or both. In this manner, x-ray data, reconstructed images, or other data may be exchanged between the data store server 730, the image reconstruction system 732, and the networked workstations 748, such that the data or images may be remotely processed by the networked workstation 748. This data may be exchanged in any suitable format, such as in accordance with the transmission control protocol ("TCP"), the Internet protocol ("IP"), or other known or suitable protocols.

Figure 8:
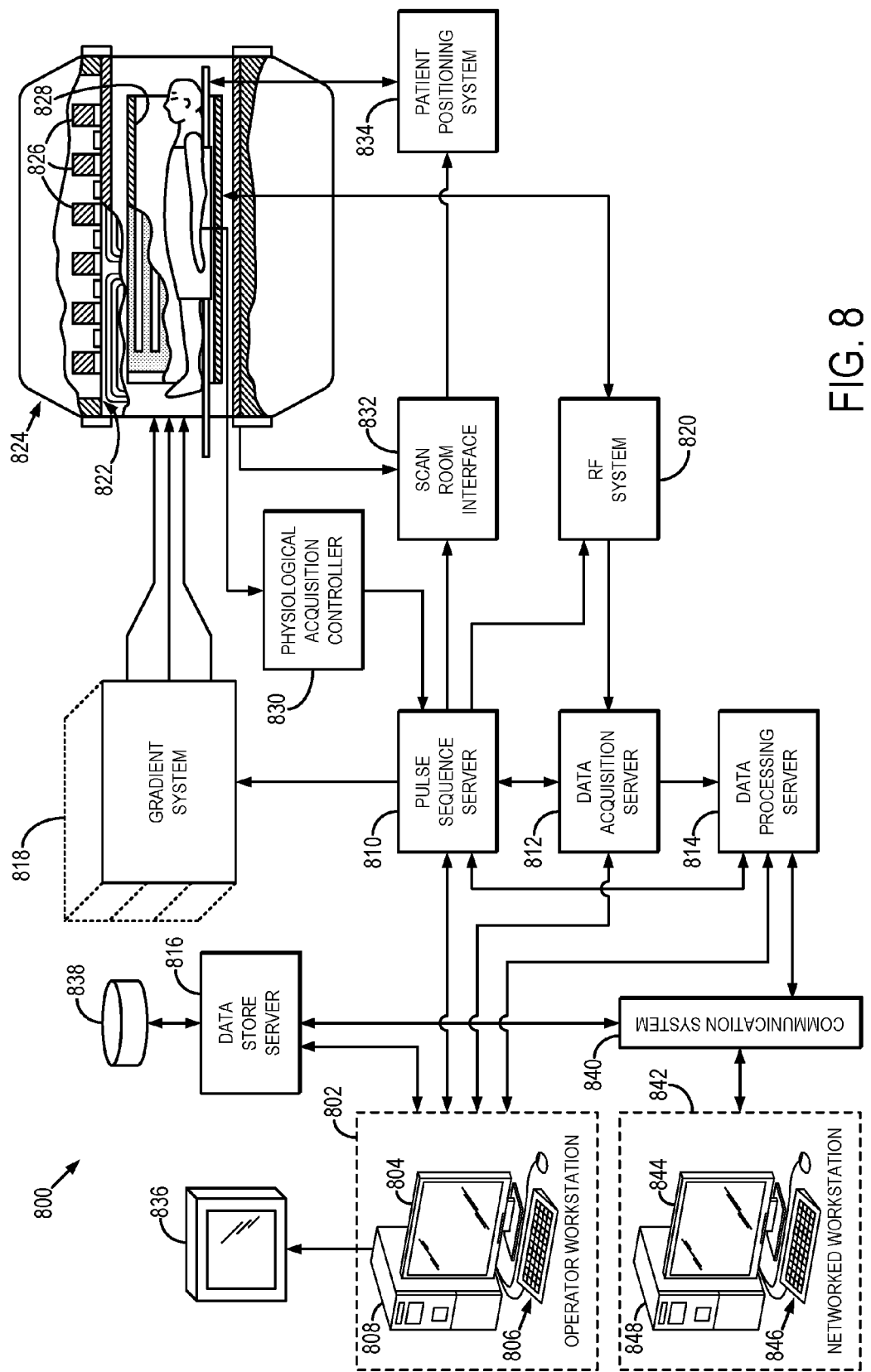
FIG. 8 is a block diagram of an example of a magnetic resonance imaging system.

Referring particularly now to FIG. 8, an example of a magnetic resonance imaging ("MRI") system 800 is illustrated. The MRI system 800 includes an operator workstation 802, which will typically include a display 804; one or more input devices 806, such as a keyboard and mouse; and a processor 808. The processor 808 may include a commercially available programmable machine running a commercially available operating system. The operator workstation 802 provides the operator interface that enables scan prescriptions to be entered into the MRI system 800. In general, the operator workstation 802 may be coupled to four servers: a pulse sequence server 810; a data acquisition server 812; a data processing server 814; and a data store server 816. The operator workstation 802 and each server 810, 812, 814, and 816 are connected to communicate with each other. For example, the servers 810, 812, 814, and 816 may be connected via a communication system 840, which may include any suitable network connection, whether wired, wireless, or a combination of both. As an example, the communication system 840 may include both proprietary or dedicated networks, as well as open networks, such as the internet.

The pulse sequence server 810 functions in response to instructions downloaded from the operator workstation 802 to operate a gradient system 818 and a radiofrequency ("RF") system 820. Gradient waveforms necessary to perform the prescribed scan are produced and applied to the gradient system 818, which excites gradient coils in an assembly 822 to produce the magnetic field gradients $G_x$, $G_y$, and $G_z$ used for position encoding magnetic resonance signals. The gradient coil assembly 822 forms part of a magnet assembly 824 that includes a polarizing magnet 826 and a whole-body RF coil 828.

RF waveforms are applied by the RF system 820 to the RF coil 828, or a separate local coil (not shown in FIG. 8), in order to perform the prescribed magnetic resonance pulse sequence. Responsive magnetic resonance signals detected by the RF coil 828, or a separate local coil (not shown in FIG. 8), are received by the RF system 820, where they are amplified, demodulated, filtered, and digitized under direction of commands produced by the pulse sequence server 810. The RF system 820 includes an RF transmitter for producing a wide variety of RF pulses used in MRI pulse sequences. The RF transmitter is responsive to the scan prescription and direction from the pulse sequence server 810 to produce RF pulses of the desired frequency, phase, and pulse amplitude waveform. The generated RF pulses may be applied to the whole-body RF coil 828 or to one or more local coils or coil arrays (not shown in FIG. 8).

The RF system 820 also includes one or more RF receiver channels. Each RF receiver channel includes an RF preamplifier that amplifies the magnetic resonance signal received by the coil 828 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2} \qquad (24);$$

and the phase of the received magnetic resonance signal may also be determined according to the following relationship:

$$\varphi = \tan^{-1}\left(\frac{Q}{I}\right). \qquad (25)$$

The pulse sequence server 810 also optionally receives patient data from a physiological acquisition controller 830. By way of example, the physiological acquisition controller 830 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 810 to synchronize, or "gate," the performance of the scan with the subject's heart beat or respiration.

The pulse sequence server 810 also connects to a scan room interface circuit 832 that receives signals from various sensors associated with the condition of the patient and the magnet system. It is also through the scan room interface circuit 832 that a patient positioning system 834 receives commands to move the patient to desired positions during the scan.

The digitized magnetic resonance signal samples produced by the RF system 820 are received by the data acquisition server 812. The data acquisition server 812 operates in response to instructions downloaded from the operator workstation 802 to receive the real-time magnetic resonance data and provide buffer storage, such that no data is lost by data overrun. In some scans, the data acquisition server 812 does little more than pass the acquired magnetic resonance data to the data processor server 814. However, in scans that require information derived from acquired magnetic resonance data to control the further performance of the scan, the data acquisition server 812 is programmed to produce such information and convey it to the pulse sequence server 810. For example, during prescans, magnetic resonance data is acquired and used to calibrate the pulse sequence performed by the pulse sequence server 810. As another example, navigator signals may be acquired and used to adjust the operating parameters of the RF system 820 or the gradient system 818, or to control the view order in which k-space is sampled. In still another example, the data acquisition server 812 may also be employed to process magnetic resonance signals used to detect the arrival of a contrast agent in a magnetic resonance angiography ("MRA") scan. By way of example, the data acquisition server 812 acquires magnetic resonance data and processes it in real-time to produce information that is used to control the scan.

The data processing server 814 receives magnetic resonance data from the data acquisition server 812 and processes it in accordance with instructions downloaded from the operator workstation 802. Such processing may, for example, include one or more of the following: reconstructing two-dimensional or three-dimensional images by performing a Fourier transformation of raw k-space data; performing other image reconstruction algorithms, such as iterative or backprojection reconstruction algorithms; applying filters to raw k-space data or to reconstructed images; generating functional magnetic resonance images; calculating motion or flow images; and so on.

Images reconstructed by the data processing server 814 are conveyed back to the operator workstation 802 where they are stored. Real-time images are stored in a data base memory cache (not shown in FIG. 8), from which they may be output to operator display 802 or a display 836 that is located near the magnet assembly 824 for use by attending physicians. Batch mode images or selected real time images are stored in a host database on disc storage 838. When such images have been reconstructed and transferred to storage, the data processing server 814 notifies the data store server 816 on the operator workstation 802. The operator workstation 802 may be used by an operator to archive the images, produce films, or send the images via a network to other facilities.

The MRI system 800 may also include one or more networked workstations 842. By way of example, a networked workstation 842 may include a display 844; one or more input devices 846, such as a keyboard and mouse; and a processor 848. The networked workstation 842 may be located within the same facility as the operator workstation 802, or in a different facility, such as a different healthcare institution or clinic.

The networked workstation 842, whether within the same facility or in a different facility as the operator workstation 802, may gain remote access to the data processing server 814 or data store server 816 via the communication system 840. Accordingly, multiple networked workstations 842 may have access to the data processing server 814 and the data store server 816. In this manner, magnetic resonance data, reconstructed images, or other data may be exchanged between the data processing server 814 or the data store server 816 and the networked workstations 842, such that the data or images may be remotely processed by a networked workstation 842. This data may be exchanged in any suitable format, such as in accordance with the transmission control protocol ("TCP"), the internet protocol ("IP"), or other known or suitable protocols.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing an image using a medical imaging system, the steps of the method comprising:
    (a) acquiring data from a subject with the imaging system;
    (b) initializing an image matrix having columns that each correspond to a different image of the subject that is consistent with at least a subset of the acquired data;
    (c) generating an augmented image matrix by augmenting the image matrix with a prior image that depicts the subject by vectorizing the prior image and concatenating the vectorized prior image as a column in the image matrix;
    (d) reconstructing at least one image of the subject from the data acquired in step (a) by:
        (i) performing a rank minimization to minimize a matrix rank of the augmented image matrix; and
        (ii) constraining the rank minimization of step (d)(i) subject to a consistency condition that promotes a forward projection of each column in the augmented image matrix to be consistent with a different subset of the acquired data, wherein each subset of the acquired data contains data that are consistent only with other data in that subset and are otherwise inconsistent with data in the other subsets of the acquired data;

wherein step (a) includes acquiring contrast-enhanced data from the subject using a cone beam computed tomography imaging system, and wherein the data are acquired over a short scan.

2. The method as recited in claim 1, wherein step (d) includes reconstructing a plurality of images, and wherein each subset of the acquired data corresponds to a different temporal segment of the acquired data.

3. The method as recited in claim 1, wherein step (d) includes reconstructing a plurality of images, and wherein each subset of the acquired data corresponds to a different angular segment of the acquired data.

4. The method as recited in claim 1, wherein the prior image is reconstructed from the acquired data using at least one of a backprojection technique or an iterative reconstruction technique.

5. The method as recited in claim 2, wherein step (a) includes acquiring data from a subject while a contrast agent is passing through vasculature in the subject.

6. The method as recited in claim 5, wherein step (d) includes reconstructing a contrast-free image in which no contrast agent is depicted in the vasculature in the subject and at least one contrast image in which contrast agent is depicted in the vasculature in the subject, and wherein the contrast-free image and at least one contrast image are consistent with different subsets of the acquired data.

7. The method as recited in claim 6, further comprising producing a difference image that depicts the vasculature in the subject by computing a difference between the contrast-free image and the at least one contrast image.

8. The method as recited in claim 5, wherein step (d) includes reconstructing a plurality of contrast images in which contrast agent is depicted in the vasculature in the subject, and wherein each contrast image is consistent with different subsets of the acquired data.

9. The method as recited in claim 8, further comprising producing a difference image that depicts the vasculature in the subject by computing a difference between at least two of the plurality of contrast images.

10. The method as recited in claim 5, wherein the prior image is reconstructed from the acquired data using at least one of a backprojection technique or an iterative reconstruction technique.

11. A method for reconstructing an image using a medical imaging system, the steps of the method comprising:
(a) acquiring data from a subject with the imaging system;
(b) initializing an image matrix having columns that each correspond to a different image of the subject that is consistent with at least a subset of the acquired data;
(c) generating an augmented image matrix by augmenting the image matrix with a prior image that depicts the subject by vectorizing the prior image and concatenating the vectorized prior image as a column in the image matrix;
(d) reconstructing at least one image of the subject from the data acquired in step (a) by:
(i) performing a rank minimization to minimize a matrix rank of the augmented image matrix; and
(ii) constraining the rank minimization of step (d)(i) subject to a consistency condition that promotes a forward projection of each column in the augmented image matrix to be consistent with a different subset of the acquired data, wherein each subset of the acquired data contains data that are consistent only with other data in that subset and are otherwise inconsistent with data in the other subsets of the acquired data;

wherein the data acquired in step (a) is representative of a time series of images and step (d) includes reconstructing the time series of images, wherein each column in the augmented image matrix other than the column corresponding to the prior image corresponds to one of the images in the time series.

12. The method as recited in claim 11, wherein the prior image is reconstructed from the acquired data using at least one of a backprojection technique or an iterative reconstruction technique.

13. A method for reconstructing an image using a medical imaging system, the steps of the method comprising:
(a) acquiring data from a subject with the imaging system;
(b) initializing an image matrix having columns that each correspond to a different image of the subject that is consistent with at least a subset of the acquired data;
(c) generating an augmented image matrix by augmenting the image matrix with a prior image that depicts the subject by vectorizing the prior image and concatenating the vectorized prior image as a column in the image matrix;
(d) reconstructing at least one image of the subject from the data acquired in step (a) by:
(i) performing a rank minimization to minimize a matrix rank of the augmented image matrix; and
(ii) constraining the rank minimization of step (d)(i) subject to a consistency condition that promotes a forward projection of each column in the augmented image matrix to be consistent with a different subset of the acquired data, wherein each subset of the acquired data contains data that are consistent only with other data in that subset and are otherwise inconsistent with data in the other subsets of the acquired data;

wherein the data acquired in step (a) is representative of a time series of images and step (d) includes reconstructing the time series of images, wherein each column in the augmented image matrix other than the column corresponding to the prior image corresponds to one of the images in the time series; and wherein the prior image is processed using a segmenting and compensation technique to segment regions in the prior image that are prone to motion and replace the segmented regions with a positive mean image intensity value from tissues adjacent the regions in the prior image that are prone to motion.

14. The method as recited in claim 11, wherein the time series of images depict different cardiac phases of a subject's heart and each subset of the acquired data corresponds to data acquired during a given cardiac phase.

15. The method as recited in claim 1, wherein step (a) includes acquiring contrast-enhanced data from a subject's breast using a cone beam computed tomography imaging system.

* * * * *